No. 751,897. PATENTED FEB. 9, 1904.
G. BODLÄNDER.
METHOD OF DETERMINING THE QUANTITY OF CARBONIC ACID IN GASES.
APPLICATION FILED JAN. 3, 1903.
NO MODEL.
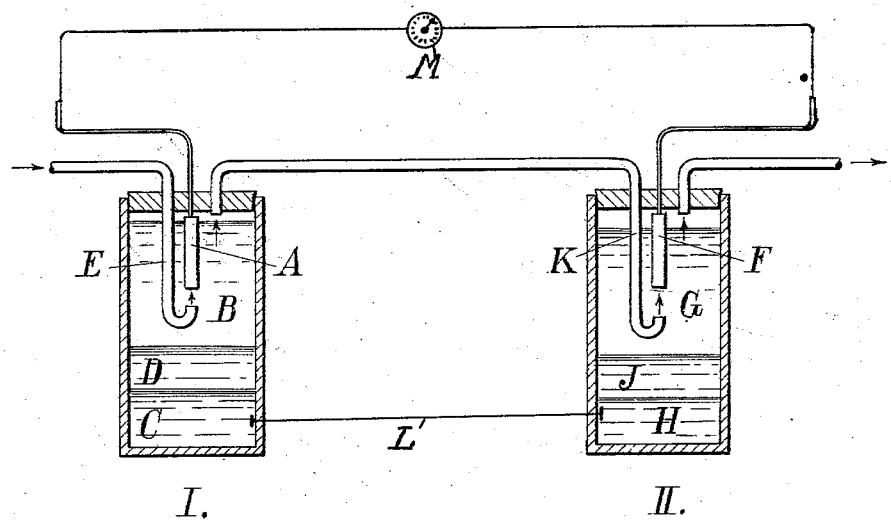

No. 751,897.

Patented February 9, 1904.

UNITED STATES PATENT OFFICE.

GUIDO BODLÄNDER, OF BRUNSWICK, GERMANY.

METHOD OF DETERMINING THE QUANTITY OF CARBONIC ACID IN GASES.

SPECIFICATION forming part of Letters Patent No. 751,897, dated February 9, 1904.

Application filed January 3, 1903. Serial No. 137,713. (No model.)

*To all whom it may concern:*

Be it known that I, GUIDO BODLÄNDER, professor, a subject of the Emperor of Germany, residing at Brunswick, Duchy of Brunswick, Empire of Germany, have invented certain new and useful Improvements in Methods of Estimating or Determining the Quantity of Carbonic Acid in Gases, of which the following is a specification.

This invention relates to a certain new and useful method for determining the amount of carbonic acid in gases by measuring by means of electric potential.

As illustrating one form of an apparatus by which the method can be carried out, reference is had to the accompanying drawing, which illustrates a sectional elevation of the said form of apparatus.

The object of the invention is to overcome the drawbacks which occur when determining the amount of carbonic acid in gases when measuring by means of a galvanic battery provided with an electrode of non-attackable metal and another of suitably-selected metal and with suitable electrolytes of a carbonate and a compound of the last-named metal. I have found the drawbacks occurring therefrom when determining the amount of carbonic acid in the gases are: First, even with a medium proportion of carbonic acid (about the same as in the air) the electromotive force is itself somewhat larger and varies comparatively little with the proportion of carbonic acid; secondly, the electromotive force varies not only with the amount of the carbonic acid, but also with the hydrogen or oxygen contained in the gas to be examined, whereby the result of the measurement is affected. The first of the drawbacks might be met if an electromotive force were introduced before or behind which is of sufficient strength or is regulatable and the direction of which is opposed to that of the cell. This might be done, for instance, by means of a very weak battery or by the splitting off of a small part of the electromotive force from a larger part.

I will first briefly explain by reference to the accompanying drawing the first galvanic cell provided with an electrode of non-attackable metal and another of suitably-selected metal and with suitable electrolytes of a carbonate and a compound of the last-named metal, so that my improvement in determining the amount of carbonic acid in gas by electric potential can be more readily understood.

If a galvanic couple I (element, battery) be formed one electrode A of which consists of a non-attackable metal, preferably platinum or platinum plated—that is to say, coated with platinum-black—which electrode is immersed in an electrolyte B, such as a bicarbonate solution, or in a liquid holding insoluble carbonate in suspension, for example, electrolyte B may be used in the following combination: 1.48 grams chlorid of potassium (KCl), 0.5 gram potassium bicarbonate (KHCO$_3$), and 10.44 grams potassium sulfate (K$_2$SO$_4$).

While the second electrode C is formed of a suitable attackable metal—for example, quicksilver, (Hg,) the electrolyte D of which consists of one of its compounds either in solution or in suspension—for instance, chlorid of mercury, (calomel, HgCl)—the electrolyte B being specifically lighter than D, and therefore remaining separated from it and above the same, and if a gas containing carbonic acid, and therewith hydrogen and oxygen, is conducted through the pipe E and be allowed to flow round the first-named electrode the electromotive force of the said couple or cell varies with the greater or lesser amount of carbonic acid contained in the gas. If the resultant potential be thus determined, a comparative number is obtained as to the amount of carbonic acid contained in the gas.

The drawbacks which occur by the employment of the single galvanic battery or galvanic couple (element, battery) have heretofore been referred to, and these drawbacks or objections are overcome by forming an element or battery which completely and simultaneously removes both drawbacks by the electromotive force being produced not merely by the action of carbonic acid, but by the action of hydrogen or oxygen. If, therefore, this element be included in the circuit reversed to the one hereinbefore described and the current of gas be conveyed through both elements, the second neutralizes that part of the electromotive force of the first which owes its existence to the amount of hydrogen or oxygen contained in the gas. By this means the result is attained that a larger scope is allowed for the choice of liquids and solid substances in both batteries, as the substances in one element cannot chemically influence those in the other, while the choice of substances would remain restricted if all were contained in the same element. By a suitable choice I may attain the result that with a given proportion of carbonic acid the electromotive force of the whole cell equals *nil* or reaches any other suitable or desired value and that in addition no alteration can be produced in the electromotive force by the amount of hydrogen or oxygen contained in the gas.

The opposing battery II to be included in the circuit is formed by again selecting for the one electrode F a non-attackable metal—for instance, preferably platinum-plated platinum—and immersing this in an electrolyte G—for example, 2.45 grams sulfuric acid ($H_2SO_4$) and 20.44 grams potassium sulfate, ($K_2SO_4$.) The second electrode H consists of a suitable attackable metal—for example, quicksilver, (Hg,)—and as its electrolyte J one of its salts—for example, sulfate of mercury, ($Hg_2SO_4$.)

The electrode H of the battery II is directly connected to the electrode C of the battery I by means of the connection L, the batteries I and II placed in circuit opposite each other.

The reference character M denotes a galvanometer connected to the electrode A of the battery I and the electrode F of the battery II.

The current of gas to be examined may be allowed to flow successively or separately through the pipes E and K into both batteries round the non-attackable electrode. The resulting electromotive force then forms a direct and reliable means for measuring the amount of carbonic acid contained in the gas.

The two cells connected opposite to each other have generally no definite electromotive force if a gas is not conducted through them which contains hydrogen or oxygen and with it carbonic-acid gas. The unattackable metal platinum produces electricity only in combination with a gas. If no gas is conducted through, then the cells have of themselves no definite difference of potential as compared with one another. Such only comes into existence when gas is conducted through them. The application is not limited to the examples given. They can be changed as occasion requires. With these examples an electromotive force is derived of 0.0818 volts by the passage through of air with ten per cent. carbonic acid, whereby the quicksilver in the cell I forms the positive, that in cell II the negative pole. If the air contains 0.8 per cent. of carbonic acid, then the electromotive force will be 0.0185 volts.

If ordinary atmospheric air is conducted through the cells, then the quicksilver in the cell II will be the positive pole, the course of the current also will be reversed, and the electromotive force will be 0.0646 volts, which as compared with the case of ten-per-cent. carbonic acid indicates a difference of 0.0818 + 0.0646 volts and as well theoretically as practically corresponds to an amount of carbonic-acid gas of 0.03 per cent. The examples given indicate the delicacy of the measurement for so small a mass, which is very difficult to determine by chemical means.

Having thus fully described my invention, what I claim as new, and desire to secure by Letters Patent, is—

1. A method of measuring by electric potential the amount of carbonic acid contained in gases consisting in passing the gases through a pair of galvanic batteries, one of which is included in the circuit of and opposed to the other, resulting in an electromotive force, and then measuring said force to determine the amount of carbonic acid.

2. A method of measuring by electric potential the amount of carbonic acid contained in gases consisting in passing the gases through a primary and a secondary galvanic battery resulting in an electromotive force, and then measuring said force to determine the amount of carbonic acid, said secondary battery included in the circuit of and reversed to the primary battery, and said secondary battery adapted to neutralize that part of the electromotive force of the primary battery which owes its existence to the amount of hydrogen or oxygen contained in the gas.

3. A method of measuring by electric potential the amount of carbonic acid contained in gases consisting in passing the gases through a primary and a secondary galvanic battery resulting in an electromotive force, and then measuring said force to determine the amount of carbonic acid, said primary galvanic battery comprising an electrode of non-attackable metal and another of suitably-selected metal, and with suitable electrolytes of a carbonate and a compound of the last-named metal, and said secondary galvanic battery included in the circuit opposed to said primary galvanic battery, the electrodes of said secondary galvanic battery formed of a non-attackable and a suitably-selected metal, and the corresponding electrolytes of which are formed of a substance acting like an acid and a salt of the second-named metal, said secondary galvanic battery adapted to neutralize that part of the electromotive force of the primary galvanic battery which owes its existence to the amount of hydrogen or oxygen contained in the gas.

4. A method of measuring the amount of carbonic acid contained in gases, consisting in passing the gases through a pair of galvanic batteries resulting in an electromotive force, and then measuring said force to determine the amount of carbonic acid, one of which is provided with an electrode of non-attackable metal and another of suitably-selected metal and with suitable electrolytes of a carbonate and a compound of the last-named metal, and the other of which is provided with electrodes of a non-attackable and a suitably-selected metal and the corresponding electrolytes of which are formed of a substance acting like an acid and a salt of the second-named metal, said last-mentioned battery connected with or included in the circuit of and opposed to the first-mentioned cell.

In testimony whereof I have hereunto set my hand in presence of two subscribing witnesses.

GUIDO BODLÄNDER.

Witnesses:
 WILHELM LEHRKE,
 JULIUS SCOKEL.